US005535832A

United States Patent [19]
Benoit

[11] Patent Number: 5,535,832
[45] Date of Patent: Jul. 16, 1996

[54] LAND LEVELER AND CULTIVATOR

[76] Inventor: Terry Benoit, 13820 Arabie Rd., Rayne, La. 70578

[21] Appl. No.: 288,919

[22] Filed: Aug. 11, 1994

[51] Int. Cl.⁶ ................................................ E02F 3/64
[52] U.S. Cl. ........................ 172/195; 172/197; 172/799.5
[58] Field of Search ................................. 111/136, 139, 111/140, 147, 155, 186, 188; 172/133, 140, 142, 145, 146, 484, 195, 196, 197, 776, 799.5

[56] References Cited

U.S. PATENT DOCUMENTS

| | | | |
|---|---|---|---|
| 2,566,562 | 9/1951 | Hale | 37/153 |
| 2,733,646 | 2/1956 | Sheffield | 172/195 |
| 2,839,851 | 6/1958 | Geiszler | 172/145 X |
| 2,880,528 | 4/1959 | Lusk | 172/799.5 X |
| 3,213,554 | 10/1965 | Dalton | 37/145 |
| 3,314,386 | 4/1967 | Kopaska | 172/142 X |
| 3,324,955 | 6/1967 | Perold | 172/136 |
| 3,448,814 | 6/1969 | Bentley et al. | 172/146 |
| 4,186,805 | 2/1980 | Repski | 172/484 X |
| 4,217,962 | 8/1980 | Schaefer | 172/799.5 X |
| 4,257,487 | 3/1981 | Brown | 172/140 |
| 4,306,732 | 12/1981 | Pettibone | 280/43.23 |
| 4,553,608 | 11/1985 | Miskin | 172/197 |
| 4,898,247 | 2/1990 | Springfield | 172/799 |
| 5,265,681 | 11/1993 | Kincses | 172/145 X |

*Primary Examiner*—Terry Lee Melius
*Assistant Examiner*—Robert Pezzuto
*Attorney, Agent, or Firm*—Pravel, Hewitt, Kimball & Krieger

[57] ABSTRACT

A towed cultivator/land leveler apparatus includes a two part frame that includes tongue at the front end portion and wheels at the rear. A two part frame pivots about a transverse axis to raise/lower a leveler blade and tines that are carried at the front section of the frame. The rear of the frame extends transversely and carries a wide wheel base with multiple wheels that define the rear part of the aft frame section. Hydraulic pistons are provided to raise and lower the tines independently of the front part of the frame. An additional adjustment to the level of the tines and to the load leveling blade are provided by hydraulic pistons that pivot the aft frame section relative to the front frame section as the transverse axis and pivot of the machine is elevated.

7 Claims, 3 Drawing Sheets

LAND LEVELER AND CULTIVATOR

BACKGROUND OF THE INVENTION

1. Field of the Invention

The present invention relates to cultivating equipment and more particularly relates to an improved cultivator and land leveler device that can be towed by a tractor and which includes a pivoting frame having front and rear sections joined by a transverse pivot. As the pivot elevates, the front section of the frame inclines to elevate tines and a load leveling blade. The tines are independently moveable between raised and lowered positions with respect to the front frame section thus providing a dual adjustability to elevation of the tines and an adjustability of the tines relative to the elevational position of the land leveling blade.

2. General Background

In the cultivation of land, towed cultivators are known in the art. There are presently available field cultivators, land levelers, seed bed conditioners, and disk devices for breaking up land.

Several cultivators and land levelers are the subject of issued United States patents. An earlier patent that shows a scraper or land leveler is U.S. Pat. No. 2,566,562 issued to Omhale and entitled "Scraper and Backfilling Blade Attachment for Tractors". The '562 patent discloses a blade attachment for tractors that includes a beam extending transversely of the tractor at the rear of the tractor, a pair of fixed spaced ears on the beam, and a frame fixedly attached to the ears and rising above the beam. Side plates fixed to each end of the beam are provided and a scraper blade rotatably mounts in each of the side plates at the rear of the side plates. A plurality of scarifying fingers are mounted on the frame.

A patent that relates to a land leveler blade is seen in U.S. Pat. No. 3,213,554 entitled "Implement Rotary Draw Bar and Hitch Connections" issued to N. J. Dalton. The Dalton patent discloses a curved blade having end plates at opposing ends of the blade. The apparatus disclosed in the Dalton patent is described as a scraper.

An earth working machine having scarifying and scraping implements is disclosed in U.S. Pat. No. 3,324,955 entitled "Earth Working Machines" issued to L. Perold. The '955 patent includes a scraper and a scarifying tool spaced fore and aft from each other along the body of the implement. The scarifying tool is selectively movable between earth working and transport positions and the scraper is rotatable about an upright axis.

U.S. Pat. No. 3,448,814 issued to T. A. Bentley discloses a grader bucket construction. The apparatus includes a bucket having a lower scraping edge at the rear of the bucket, plow blades at the front of the bucket, racking tines between the scraping edge and the plow blades, and a grooved roller mounted to the rear of the bucket. The apparatus has a back filled blade mounted thereon and includes means for selectively positioning the racking tines and the roller into and out of operating position.

A combination disk and leveler is the subject of U.S. Pat. No. 4,257,487 entitled "Water Stop Attachment and Border Disk". The '487 patent provides a device that includes a transverse frame member having depending border disk mounts. The transverse frame member also has a hitch extending forwardly therefrom for attachment to a three point hitch on a tractor. The water stop attachment has a ladder type frame work with one side of the ladder frame pivotally attached to the border disk transverse frame member. A spaced parallel frame member of the ladder frame is attached to a plurality of stop blades which are located directly behind the depending border disk mounts. A single hydraulic cylinder extends between a raised portion of the three point hitch and a central member of the ladder frame for raising and lowering the stop mechanism upon actuation of hydraulic switch or valve located in the cab of a tow vehicle.

A depth control for agricultural implements is disclosed in the Pettibone U.S. Pat. No. 4,306,732. The '732 patent discloses a control for selectively setting the operating depth of a ground working agricultural tool without changing the elevated height to the tool when in the transport position. The control includes a ground supported wheel frame pivotally mounting a tool frame. The tool frame is pivoted on the wheel frame between the raised inoperative position and a lowered operative position by operation of a cylinder assembly. The cylinder assembly is pivoted at one end to the tool frame. Its remaining end is connected to a bracket on the wheel frame. The bracket includes a slot, slidably mounting the remaining end of the cylinder. The slot is aligned along an arc centered on the pivot axis of the cylinder at its one end when the tool frame is elevated to the inoperative position. An adjustment on the bracket enables positioning of the remaining cylinder end within the slot without changing the stroke length of the cylinder. The adjustment can be operated to raise or lower the tool frame in relation to the wheel frame, thereby changing the operating depth. Such adjustments are said to not affect the transport position of the tool frame.

The Miskin U.S. Pat. No. 4,553,608 provides a scraper machine for ground leveling and earth planting having a scraper unit and a ripper assembly for scarifying and loosening the advance of leveling and planing and with the ripper assembly being carried by a raised front end member of the scraper unit, vertically adjustable with respect to the scraper unite, and pulled through a ripper tongue that is pivotally connected to a main tongue of the scraper unit.

The Springfield U.S. Pat. No. 4,898,247 discloses a earth scraper attachment adapted to be drawn by a farm tractor or other vehicle having a vertically adjustable three point hitch has an elongated frame with a front tongue portion connectable tot he hitch with a specially designed hitch connection member. A rear end portion of the frame is supported on opposite sides of the longitudinal axis of the frame by a pair of wheels whose heights relative to the frame bay be selectively and independently adjusted. Depending from a longitudinally central portion of the frame is an earth scraping blade which is supported on the frame for pivotal motion about a generally vertically extending axis, and may be locked in a selected pivotally adjusted position. A laterally spaced series of downwardly extending earth ripping teeth are supported beneath the frame forwardly of the scraping blade and are used to rip and loosen the earth prior to operation thereon by the scraping blade. The independent height adjustment of the rear support wheels, together with the tongue height adjustment provided by the three point hitch are said to allow various positional adjustments to be made to the frame including uniformly raising or lowering the overall frame, altering its front-to-rear tilt angle and altering its side-to-side tilt angle about the longitudinal frame axis. These frame positional adjustments, coupled with the pivotal adjustment capability of the scraping blade permit the blade and its associated ripping teeth are said to be variously positioned to perform most of the sophisticated earth-scraping and grading functions of heavy duty commercial apparatus, such as motor graders at a fraction of the cost thereof.

SUMMARY OF THE INVENTION

The present invention provides an improved land leveler and cultivator apparatus that provides independent adjustment of land leveling blade member and a plurality of shanks by means of a unique pivoting frame arrangement wherein the frame includes a pivot member that connects fore and aft sections of the frame. This allows the pivot to be elevated as the front and aft frame sections incline.

The apparatus includes a longitudinally extending frame having front and aft sections that are pivotally attached at the center of the overall frame. The pivot member extends substantially the width of the frame, and defines the rear of the front frame section in front of the aft frame section.

A plurality of wheels are spaced transversely across the rear end of the aft frame section. The pivot can be elevated so that the front frame section is inclined to define an ever increasing acute angle with the underlying earth.

A land leveling blade is attached to the rear portion of the front frame section and is elevated during an inclination of the front frame section as occurs when the pivot is elevated.

A plurality of cultivating shanks are pivotally attached to the front frame section on a rotating bar. This arrangement enables all of the shanks to rotate together with the bar into desired elevational positions relative to the front frame section. The elevation of the shanks is adjustable independently of the elevation of the front frame section and thus is independently of the elevation of the land leveler blade.

In the preferred embodiment, the shanks comprise a plurality of spaced apart members spaced transversely across the frame.

In the preferred embodiment, shanks are mounted on a bar and rotatable together therewith so that the lower end of each shank can be placed into multiple elevational positions independently of the elevational position of the front frame section.

In the preferred embodiment, means is provided for powering the shanks to move between elevated and lowered positions. In the preferred embodiment, the powering is provided by a hydraulic cylinder that extends and retracts a pushrod which is connected via linkage to the bar that carries the shanks.

In the preferred embodiment, a plurality of hydraulic cylinders are spaced transversely across the frame, each including end portions that are connected respectively to the front frame section and to the aft frame section. One of the hydraulic cylinders defining a means for raising and lowering the shanks, the other cylinder raises and lowers the pivot relative to the underlying earth.

In the preferred embodiment, the shanks extend transversely across the front portion of the frame, the shanks being pivotally mounted to the frame between elevated and lowered positions wherein a hydraulic piston raises and lowers the shanks independently of movement of one frame section relative to another.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
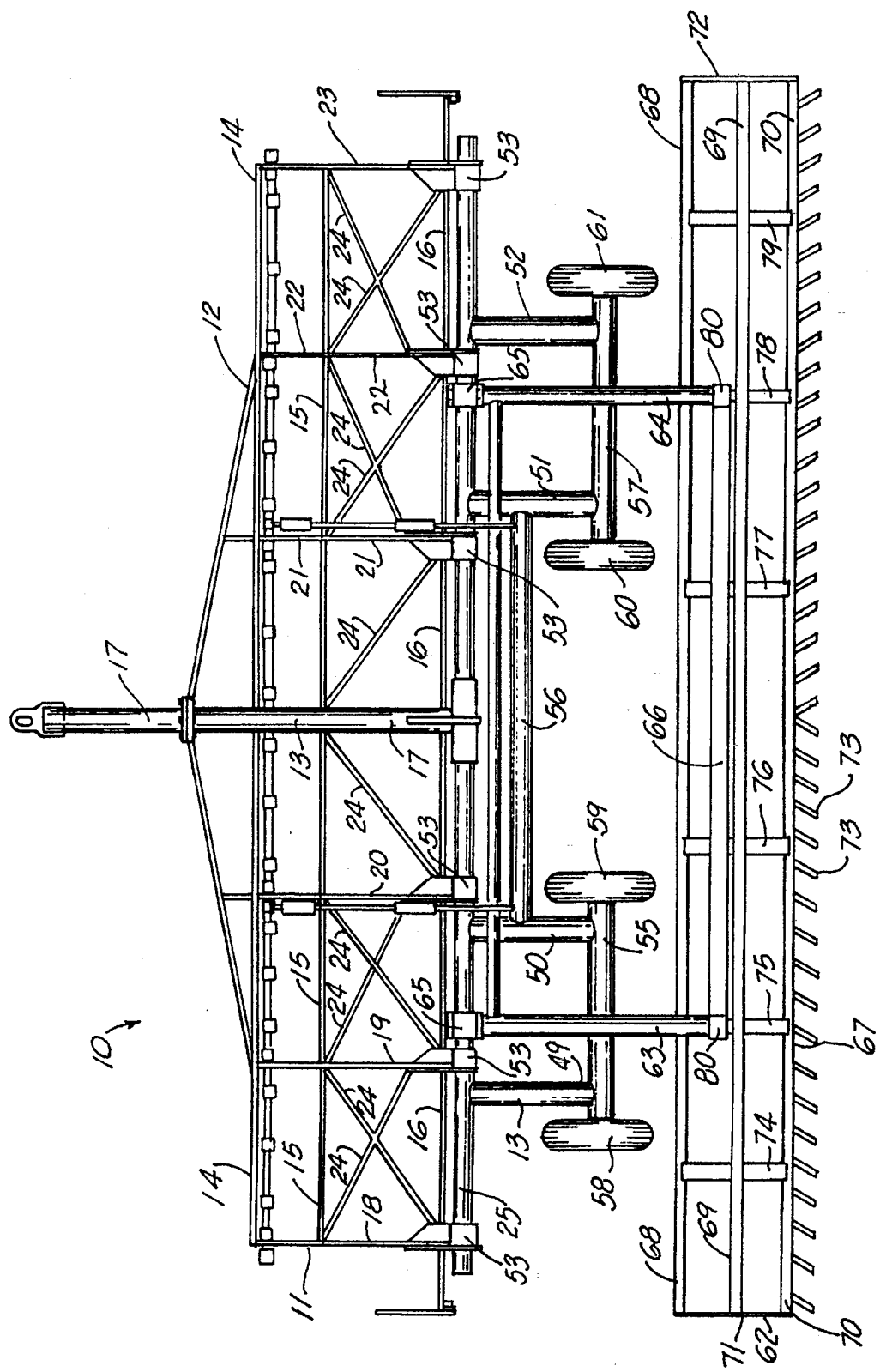
FIG. 1 is a top plan view of the preferred embodiment of the apparatus of the present invention.

FIG. 1 shows generally the preferred embodiment of the apparatus of the present invention designate generally by the numeral 10. Cultivator apparatus 10 includes an enlarged laterally extending frame 11 having a front end portion 12 and a rear portion 13. The front end includes a tow bar 17 with a tongue for attaching the cultivator 10 to a tractor T, the preferred vehicle for transporting the apparatus 10 during use.

Frame 11 includes a plurality of transverse beams 14–16 and a plurality of longitudinal beams 18–23. Tow bar 17 extends longitudinally at the central portion of frame 11 as shown in FIG. 1. The tow bar 17 can be provided with a commercially available type tongue connection for attaching the tow bar 17 to a tractor T that tows the cultivator apparatus 10 during use as shown in FIGS. 2 and 3.

A pivot pipe 25 joins front end portion 12 and rear end portion 13. Pivot 25 allows frame 11 to hinge at its center, elevating the pivot 25 into the air and thus inclining each of the frame portions 12, 13.

Figure 2:
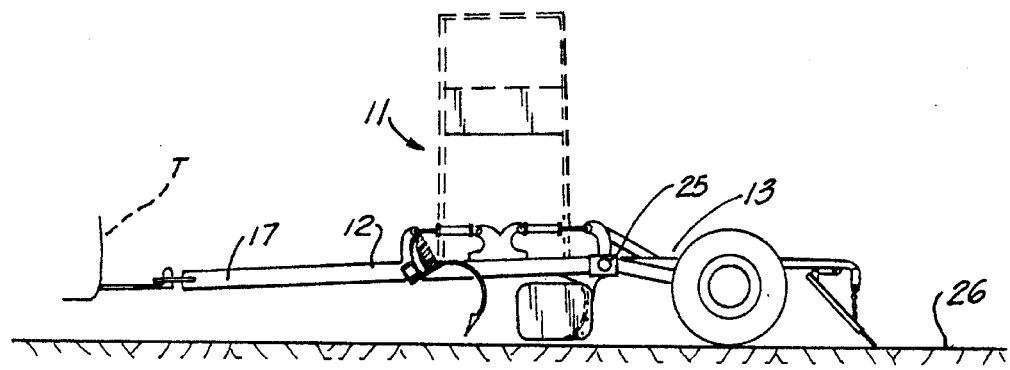
FIG. 2 is a side, elevational view of the preferred embodiment of the apparatus of the present invention in a lowered position.
Figure 3:
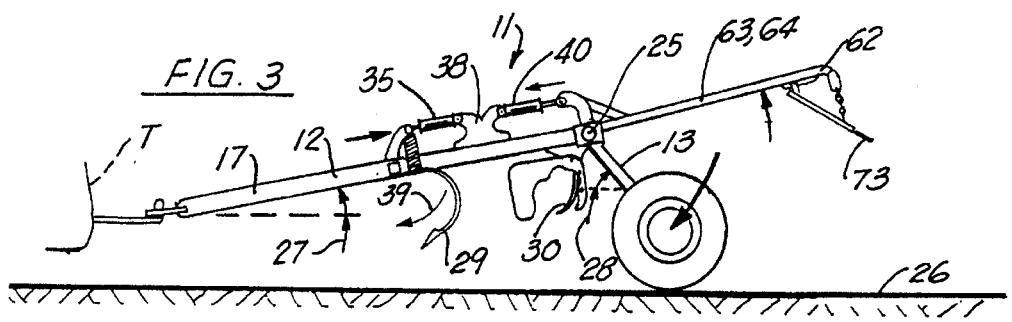
FIG. 3 is side, elevational view of the preferred embodiment of the apparatus of the present invention shown in an elevational position.

In FIG. 2, frame 11 is in a lowered position. In this position, the pivot pipe 25 is lowered to a position adjacent the ground surface, designated as 26 in FIGS. 2 and 3. In FIGS. 3, the pivot 25 has been elevated above ground surface 26. This elevation of the pivot pipe 25 is achieved using hydraulic cylinders as will be described more fully hereinafter. When the pivot pipe 25 is elevated, the front end portion 12 of the frame 11 is fully inclined forming a maximum acute angle, designated by the numeral 27 in FIG. 3. Similarly, rear end portion 13 of frame 11 is inclined forming an angle 28 as shown in FIG. 3. The elevation of pivot pipe 25 and the corresponding inclination of frame sections 12, 13 produces an infinitely variable elevation to both shanks 29 and leveler blade 30 relative to ground surface 26. The farmer simply elevates the pivot 25 until the desired elevational position of leveler blade 30 and shanks 29 is achieved.

A second adjustability of elevation is provided to shanks 29. This adjustability of shanks 29 is provided by a rotation of the shanks 29 about pivot 31 (see FIG. 4).

Figure 4:
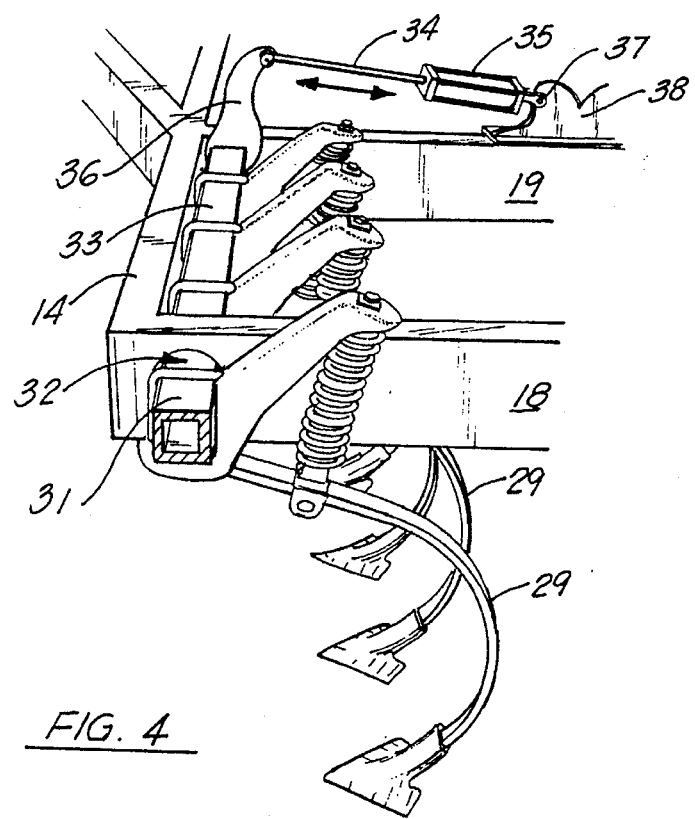
FIG. 4 is a fragmentary perspective view of the preferred embodiment of the apparatus of the present invention.

Each of the longitudinal beams 18–23 provides an opening 32 that accommodates bar 33. The bar 33 supports the plurality of shanks 29 as shown. Shanks 29 are commercially available farming implements. The shanks 29 rotate with bar 33 responsive to an extension and contractions of push rod 34 as actuated by hydraulic cylinder 35. Push rod 34 engages plate 36 that is welded or otherwise connected to bar 33 as shown in FIG. 4. Hydraulic cylinder 35 can be attached at pinned connection 37 into gusset plate 38.

Independently of the elevation of pivot 25, shanks 29 can be elevated when bar 33 is rotated responsive to an extension of telescoping pushrod 34 relative to hydraulic cylinder 35. This rotation of bar 33 and shanks 29 is schematically shown by the arrow 39 in FIG. 4. A hydraulic cylinder 40 is attached to an opposing end portion of gusset plate 38 that is spaced away from cylinder 35. This cylinder 40 has a pushrod 41 that extends and contracts as shown by arrow 42 in FIG. 6 during a rotation of frame rear end portion 13 relative to frame front portion 11 as shown by arrow 43 in FIG. 6. Cylinder 40 is attached at pinned connection 44 to gusset 38. Pushrod 41 is connected at pinned connection 45 to structural plate member 46. The plate member 46 is welded to pivot 25 at connection 47 and to frame rear section 13 at connection 48. Frame rear section 13 includes a plurality of longitudinal beam members 49–52.

Rear portion 13 of frame 11 further comprises three transversely extending beams 55–57. The beams 49–52 are structurally connected to pivot 25, being welded thereto for example. Pivot 25 can be in the form of an elongated cylindrically shaped pipe. Similarly, the beams 49–52 and the beams 55–57 can be pipe sections as well. Thus, the entire subframe that comprises pivot pipe 25, beams 49–52, and beams 55–57, can be a structurally integrally connected frame of welded pipe for example.

A plurality of bushings 53 are cylindrically shaped to conform to the outer surface of the pivot 25. Each of the bushings 53 is structurally connected to a longitudinal beam 18–23 of front end portion of 12 of frame 11. Thus, the pivot pipe 25 and its associated rear frame portion 13 pivot when the pivot pipe 25 rotates in bushings 53. Four wheels 58–61 are provided. A pair of the wheels 58, 59 are mounted at end portions of transverse beam 55. A pair of wheels 60, 61 are mounted to end portions of the beam 57. Wheels 58–61 are mounted to beams 55, 57 using conventional axle, hub and rim technology that is commercially available.

Figure 6:
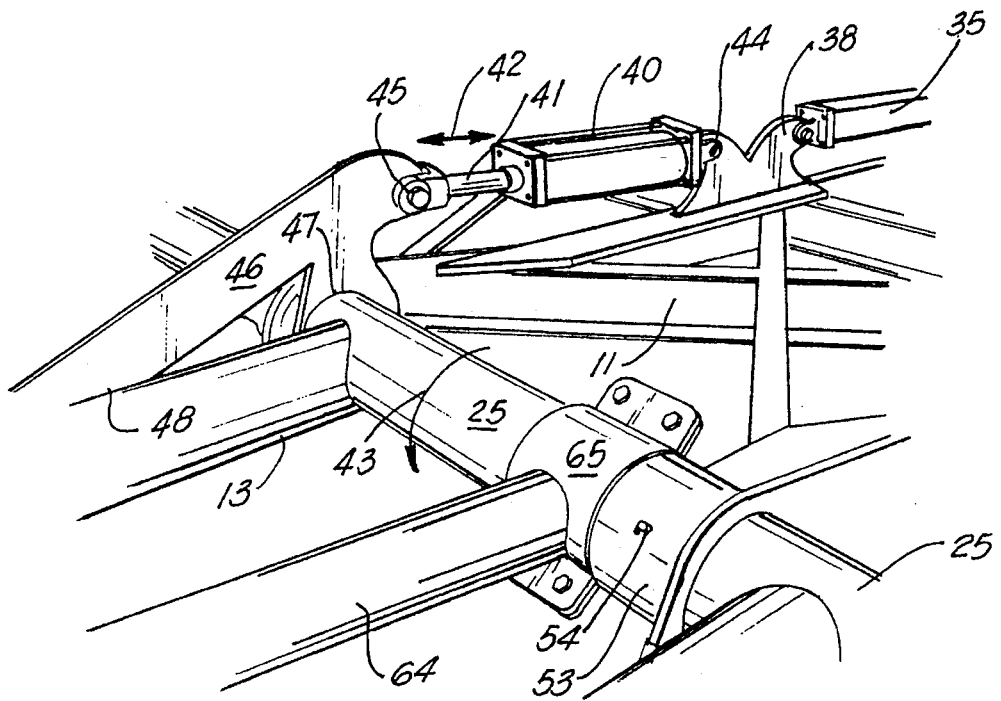
FIG. 6 is a fragmentary perspective view of the preferred embodiment of the apparatus of the present invention.

When the hydraulic cylinder 40 is activated, it pushes the push rod 41 rearwardly, rotating the rear frame portion 13 about pivot 25 as shown by the arrow 43 in FIG. 6. During such extension of pushrod 41, the front end portion 12 of frame 11 inclines, elevating shanks 29 and level of blade 30.

However, the leveler blade 30 will elevate higher than the shanks 29 because the shanks 29 are closer to the front of the frame 11. Thus, in order to compensate for this difference in elevation relative to the overall frame 11, the shanks 29 are independently adjustable into an elevational position using hydraulic cylinder 35 to affect that change in elevational position of the shanks 29. The farmer can adjust the leveler blade 30 and/or the shanks 29 independently into a desired elevational position with respect to the underlying ground surface 26.

As an optional tool, pulverizer 62 can be attached to frame 11, extending behind wheels 58–61 as shown in FIG. 1. The pulverizer 62 comprises a pair of longitudinally extending supports 63, 64 that are rigidly connected to bushings 53 so that the longitudinal supports 63, 64 do not rotate with pipe pivot 25. Rather, the longitudinal support 63, 64 remain generally parallel to front end portion 12 of frame 11 when pivot pipe 25 is elevated as shown in FIG. 2.

Figure 5:
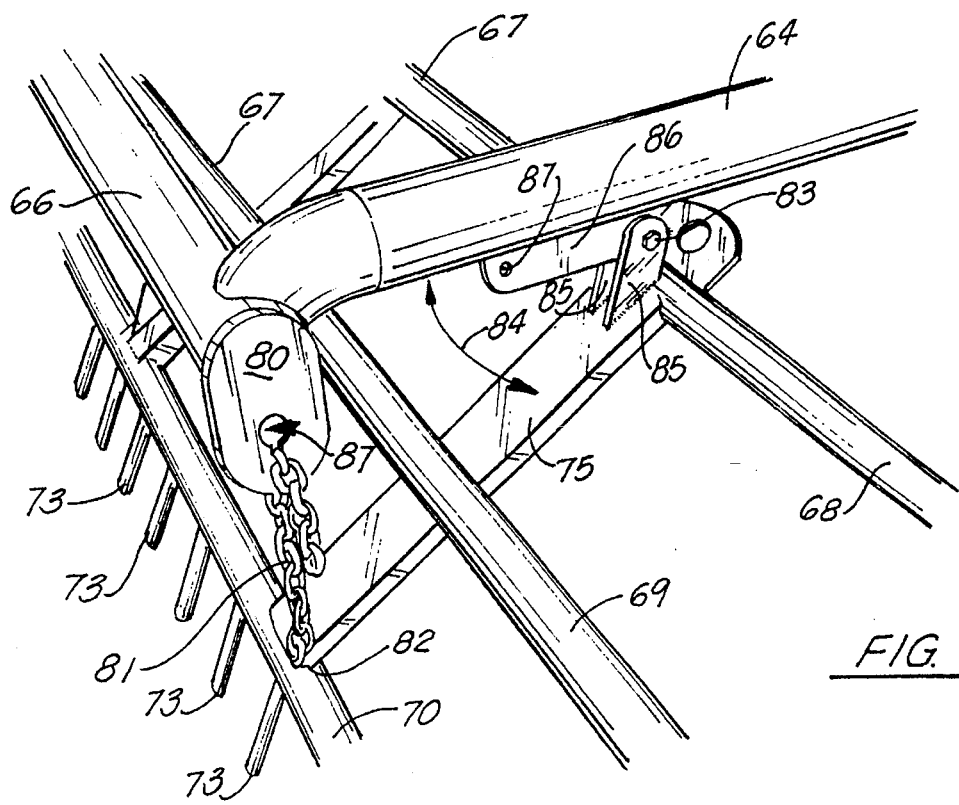
FIG. 5 is a fragmentary perspective view of the preferred embodiment of the apparatus of the present invention.

A transverse beam 66 extends between longitudinal supports 63, 64. A plurality of transverse extending beams 68–70 and a plurality of longitudinal beams 74–79 form a single structural frame that pivotally attaches to the plurality of beams 63–64 and 66. In FIG. 5, a pivotal movement of the teeth 73 of pulverizer 62 is designated generally by the numeral 84. The pulverizer 62 includes end plates 71, 72 that are welded for example to the transverse beams 68–70.

Teeth 73 can be angularly oriented relative to transverse beams 70. Chain anchor 80 is mounted at the connection between each beam 63, 64 and the transverse beam 66. Chain anchor 80 has an opening 87 that includes a lower slotted portion for receiving individual links of chain 81. This allows any particular link of chain 81 to be affixed to opening 87 at its slotted portion. The user simply raises and lowers the teeth 73 by allowing the chain 81 to connect to the opening 87 at a desired position.

A pivotal connection is formed at 83 by bolting for example or pinning the two plate members 85 that are generally parallel to the single gusset plate member 86. The gusset plate member 86 can have openings 87 at its end portions so that the plates 85 can be bolted or pinned to either of the selected openings 87.

Chain 81 can be connected by welding, bolting or the like to transverse beam 70 at its connection to longitudinal beam 75. The pulverizer 62 can be removed by unbolting or unpinning the connection 83 and disengaging the chain 81 if desired. In the preferred embodiment, there are two pivotal connections as shown in FIG. 5 including one at the longitudinal support 63 and its chain anchor 80 and another at the longitudinal support 64 and its chain anchor 80.

The following table lists the parts numbers and parts descriptions as used herein and in the drawings attached hereto.

| PARTS LIST | |
| --- | --- |
| Part Number | Description |
| 10 | cultivator apparatus |
| 11 | frame |
| 12 | front end portion |
| 13 | rear end portion |
| 14 | transverse beam |
| 15 | transverse beam |
| 16 | transverse beam |
| 17 | tow bar |
| 18 | longitudinal beam |
| 19 | longitudinal beam |
| 20 | longitudinal beam |
| 21 | longitudinal beam |
| 22 | longitudinal beam |
| 23 | longitudinal beam |
| 24 | diagonal beams |
| 25 | pivot pipe |
| 26 | ground surface |
| 27 | angle |
| 28 | angle |
| 29 | shank |
| 30 | leveler blade |
| 31 | pivot |
| 32 | opening |
| 33 | bar |
| 34 | pushrod |
| 35 | cylinder |
| 36 | plate |
| 37 | pinned connector |
| 38 | gusset plate |
| 39 | arrow |
| 40 | cylinder |
| 41 | pushrod |
| 42 | arrow |
| 43 | arrow |
| 44 | pinned connection |
| 45 | pinned connection |
| 46 | plate member |
| 47 | connection |
| 48 | connection |
| 49 | longitudinal beam |
| 50 | longitudinal beam |
| 51 | longitudinal beam |
| 52 | longitudinal beam |
| 53 | bushing |
| 54 | grease fitting |

PARTS LIST

| Part Number | Description |
| --- | --- |
| 55 | transverse beam |
| 56 | transverse beam |
| 57 | transverse beam |
| 58 | wheel |
| 59 | wheel |
| 60 | wheel |
| 61 | wheel |
| 62 | pulverizer |
| 63 | longitudinal support |
| 64 | longitudinal support |
| 65 | clamp |
| 66 | clamp |
| 67 | transverse support |
| 68 | transverse beam |
| 69 | transverse beam |
| 70 | transverse beam |
| 71 | end plate |
| 72 | end plate |
| 73 | teeth |
| 74 | longitudinal beam |
| 75 | longitudinal beam |
| 76 | longitudinal beam |
| 77 | longitudinal beam |
| 78 | longitudinal beam |
| 79 | longitudinal beam |
| 80 | chain anchor |
| 81 | chain |
| 82 | weld |
| 83 | pivot |
| 84 | arrow |
| 85 | plate |
| 86 | plate |
| T | tractor |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A cultivator and land leveling apparatus comprising:

a) a longitudinally extending frame having a tongue for towing the frame;

b) the frame including a front and aft sections that are movably attached relative to one another, the front frame section defining a first plane, the aft frame section defining a second plane each of the front and rear frame sections having a length and a width, and the width of the front and rear frame sections being much greater than their respective lengths;

c) a transversely extending pivot member that extends substantially the width of the frame, the pivot lying in each of the front and rear planes, defining the rear of the front frame section and the front of the aft frame section;

d) a plurality of wheels spaced transversely across the rear end of the aft frame section;

e) the aft frame section having a plurality of longitudinal beams that are connected to and rotate with the pivot member, said beams extending from the pivot member to a position well behind the pivot member, each beam being about the same length as the length of the front frame section;

f) a plurality of transverse axles, each axle being connected to a plurality of the longitudinal beams generally opposite the pivot member each axle carrying a plurality of the wheels;

g) means for elevating the pivot so that the front frame section is inclined to define an ever increasing acute angle with the underlying earth;

h) a land leveling blade attached to the rear portion of the front frame section communicating with the first plane;

i) a plurality of cultivating shanks pivotally attached to the front frame section, communicating with the first plane;

j) means for elevating the shanks independently of the land leveler blade; and k) wherein the tongue, leveling blade and shanks communicate with the first plane in elevated and in lowered positions.

2. The apparatus of claim 1 further comprising a plurality of shanks spaced transversely across the frame.

3. The apparatus of claim 2 wherein the tines are mounted on a bar, and rotatable together there with into multiple elevational positions independently of the elevational position of the front frame section.

4. The apparatus of claim 3 further comprising means for powering the shanks to move between elevated and lowered positions.

5. The apparatus of claim 1 further comprising auxiliary frame section attached to the rear portion of the aft frame section for supporting land cultivating tools behind the wheels.

6. The apparatus of claim 1 further comprising a plurality of hydraulic cylinders spaced transversely across the frame and including end portions that connected respectively to the front frame section and to the aft frame section, the hydraulic cylinders defining means for raising and lowering the pivot relative to the underlying earth.

7. The apparatus of claim 1 further comprising a plurality of shanks extending transversely across the front part of the frame, the shanks being pivotally mounted to the frame between elevated and lowered positions and further comprising hydraulic piston means for raising and lowering the shanks.

* * * * *